US 9,488,470 B1

(12) United States Patent
Peterson et al.

(10) Patent No.: US 9,488,470 B1
(45) Date of Patent: Nov. 8, 2016

(54) METHOD FOR NON-DESTRUCTIVE EVALUATION OF CERAMIC COATINGS

(71) Applicants: Southwest Sciences Incorporated, Santa Fe, NM (US); University of Connecticut, Farmington, CT (US)

(72) Inventors: Kristen A. Peterson, Santa Fe, NM (US); Elias P. Rosen, Chapel Hill, NC (US); Eric H. Jordan, Storrs-Mansfield, CT (US); Sina Shahbazmohamadi, New York, NY (US); Andrei B. Vakhtin, New Mexico, NM (US)

(73) Assignees: UNIVERSITY OF CONNETICUT, Farmington, CT (US); SOUTHWEST SCIENCES INCORPORATED, Sante Fe, NM (US)

( * ) Notice: Subject to any disclaimer, the term of this patent is extended or adjusted under 35 U.S.C. 154(b) by 463 days.

(21) Appl. No.: 14/180,914

(22) Filed: Feb. 14, 2014

Related U.S. Application Data

(60) Provisional application No. 61/865,376, filed on Aug. 13, 2013.

(51) Int. Cl.
*G01B 11/24* (2006.01)
*G01B 9/02* (2006.01)

(52) U.S. Cl.
CPC ......... *G01B 11/2441* (2013.01); *G01B 9/0209* (2013.01); *G01B 11/24* (2013.01)

(58) Field of Classification Search
CPC ........................... G01B 11/2441; G01B 11/24
See application file for complete search history.

(56) References Cited

U.S. PATENT DOCUMENTS

| 5,426,506 | A | 6/1995 | Ellingson et al. |
| 6,847,449 | B2 | 1/2005 | Bashkansky et al. |
| 7,061,622 | B2 | 6/2006 | Rollins et al. |
| 7,447,408 | B2 | 11/2008 | Bouma et al. |
| 7,918,141 | B1 | 4/2011 | Sathish et al. |
| 8,300,232 | B2 | 10/2012 | Sansom et al. |
| 8,488,112 | B2 * | 7/2013 | Jeannot ........................ 356/517 |
| 2013/0062323 | A1 | 3/2013 | Hassan et al. |

OTHER PUBLICATIONS

Bashkansky, et al., "Statistics and reduction of speckle in optical coherence tomography", Optics Letters, Apr. 15, 2000, 545-547.
Bashkansky, et al., "Subsurface defect detection in ceramics by high-speed high-resolution optical coherent tomography", Optics Letters, 1997, 61-63.

(Continued)

*Primary Examiner* — Hwa Lee
(74) *Attorney, Agent, or Firm* — Jeffrey D. Myers; Peacock Myers, P.C.

(57) ABSTRACT

A method for evaluating the condition of a ceramic coating deposited on a substrate comprising illuminating the ceramic coating with light, measuring the intensity of light returned from the ceramic coating as function of depth in the coating and transverse position on the coating, and analyzing the measured light intensities to obtain one or more of intensity of the light returned from the exposed coating surface relative to the intensity of light returned from the coating/substrate interface, intensity of the light returned from the coating/substrate interface relative to the intensity of light returned from the bulk of the ceramic coating, determination of roughness at the exposed surface of the ceramic coating, and determination of roughness of the interface between the ceramic coating and underlying bond coat or substrate.

14 Claims, 7 Drawing Sheets

(56) References Cited

OTHER PUBLICATIONS

Brezinski, et al., "Index Matching to Improve Optical Coherence Tomography Imaging Through Blood", Circulation, 2001, 1999-2003.

Corlu, et al., "Diffuse optical tomography with spectral constraints and wavelength optimization", Applied Optics, Apr. 10, 2005, 2082-2093.

Dehghani, et al., "The effects of internal refractive index variation in near-infrared optical tomography: a finite element modelling approach", Physics in Medicine and Biology, 2003, 2713-2727.

Eldridge, et al., "Monitoring Delamination Progression in Thermal Barrier Coatings by Mid-Infrared Reflectance Imaging", International Journal of Applied Ceramic Technology, 2006, 94-104.

Eldridge, et al., "Nondestructive Evaluation of Thermal Barrier Coatings by Mid-Infrared Reflectance Imaging", Advances in Ceramic Coatings and Ceramic-Metal Systems: Ceramic Engineering and Science Proceedings, 2005.

Ellingson, et al., "Optical NDE Methods for Ceramic Thermal Barrier Coatings", Invited paper for publication in Materials Evaluation, Nov. 2005.

Jackson, "Terahertz Time-Domain Reflectometry of Multilayered Systems", Dissertation, 2008, 33-55.

Nemeth, et al., "Applications in Non-Destructive Testing and Evaluation", Optical Coherence Tomography, ed. Masanori Kawasaki, Mar. 6, 2013, 163-185.

Nychka, et al., "Damage quantification in TBCs by photo-stimulated luminescence spectroscopy", Surface and Coatings Technology, 2001, 110-116.

Stifter, et al., "Advanced Optical Coherence Tomography techniques: novel and fast imaging tools for nondestructive testing", 17th World Conference on Nondestructive Testing, Oct. 25-28, 2008.

Tuchin, et al., "Dynamic Optical Coherence Tomography in Studies of Optical Clearing, Sedimentation, and Aggregation of Immersed Blood", Applied Optics, 2002, 258-271.

Vakhtin, et al., "Combination of Fourier-Domain Optical Coherence Tomography and Photo-Stimulated Luminescence Piezo-Spectroscopy as an NDE Tool for Thermal Barrier Coatings", Proceedings of GT2007 ASME Turbo Expo 2007: Power for Land, Sea and Air, May 14-17, 2007, 1-5.

Zhang, et al., "Full range polarization-sensitive Fourier domain optical coherence tomography", Optics Express, Nov. 29, 2004, 6033-6039.

\* cited by examiner

*Dry sample*

*Sample with index matching fluid*

$$\text{Contrast} = \frac{\text{Bond}}{\text{Baseline}} \qquad \text{Penetration Ratio} = \frac{\text{Bond} - \text{Baseline}}{\text{Top} - \text{Baseline}}$$

METHOD FOR NON-DESTRUCTIVE EVALUATION OF CERAMIC COATINGS

CROSS-REFERENCE TO RELATED APPLICATIONS

This application claims priority to and the benefit of the filing of U.S. Provisional Patent Application Ser. No. 61/865,376, entitled "Method for Non-Destructive Evaluation of Ceramic Coatings", filed on Aug. 13, 2013, and the specification and claims thereof are incorporated herein by reference.

STATEMENT REGARDING FEDERALLY SPONSORED RESEARCH OR DEVELOPMENT

This invention was made with government support under Contract No. DE-SC0001872 awarded by the U.S. Department of Energy. The government has certain rights in the invention.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods for non-destructively evaluating the condition and remaining service life of ceramic coatings.

2. Description of Related Art

Thermal barrier coatings (TBCs) are used in gas power and aircraft engine turbines to protect metal vanes and blades from the combustion gas stream. TBCs increase the useful life of turbine components and improve turbine efficiency by allowing increased operating temperatures. TBCs are typically used in the first turbine stage directly following the combustor and provide insulation and oxidation resistance for the metal components. These coatings consist of four basic layers: the substrate, the bond coat, a thermally grown oxide layer (TGO) which develops during use, and the ceramic top coat. During the course of part service, which includes cyclic heating and stress, TBC integrity degrades. Degradation modalities include microcracking within the top coat and shearing or rumpling at the interface between the ceramic top coat and bond layer where the TGO resides. Ultimately, degradation of the TBC leads to failure. If this condition occurs while the part is in service, the entire engine can be compromised. Optimization of part service life while maintaining an adequate safety factor relies on non-destructive evaluation (NDE) methods for integrity assessment.

A variety of optical approaches have been used as NDE strategies to inspect ceramic coating condition during manufacturing or use. Key parameters for assessment have included layer thickness, degree of defect, or stress present in a sample, but no single embodiment has provided a comprehensive assessment of multiple health parameters. Assessment of the TBC thickness is critical at the point of manufacture to maintain quality control. U.S. Pat. No. 8,300,232, to Sansom et al., describes a two-color infrared wavelength approach for range detection throughout the thickness of a TBC. Longer wavelengths of light penetrate preferentially through the highly scattering ceramic TBC, and strategic selection of two wavelengths provides strong backscattered radiation at the air/top coat and top coat/bond layer interfaces. While this method captures the coating thickness, it is unable to monitor changes to coating integrity.

For part inspection, imaging solutions are preferred to spot inspection in order to increase monitoring areas and reduce inspection time. Multiple imaging techniques have been employed for detection of defects and cracks. U.S. Pat. No. 5,426,506, to Ellingson et al., stipulates the use of polarized light to detect both surface and near-subsurface defects, though no correlation is made between the presence of cracks and fatigue of part in service. J. I. Eldridge, et al., "Monitoring Delamination Progression in Thermal Barrier Coatings by Mid-Infrared Reflectance Imaging", *International Journal of Applied Ceramic Technology* 3, 94-104 (2006), utilizing long penetrating mid-infrared imaging wavelengths of 3-6 µm, demonstrated that the intensity of backscattered reflectance from a TBC increases with thermal cycling. This imaging approach is limited to two-dimensions and cannot distinguish the location of crack-related scattering as a function of depth within a coating. For three-dimensional resolution, W. A. Ellingson et al., "Optical NDE Methods for Ceramic Thermal Barrier Coatings," *Mater. Eval.* 64, 45-51 (2006), used optical coherence tomography (OCT) to inspect TBCs. However, the wavelength of light limited the depth of imaging into the coating. Nor did Ellingson et al. correlate features or metrics derived from OCT images to aging or remaining service life of the coating.

Stress measurement has been viewed as a highly accurate gauge of TBC health. Stress levels within a TBC have been correlated to shifts in fluorescence monitored by photoluminescence piezo spectroscopy (PLPS). J. A. Nychka, et al., "Damage quantification in TBCs by photo-stimulated luminescence spectroscopy", *Surf. Coat. Technol.* 146, 110-116 (2001). U.S. Pat. No. 7,918,141, to Sathish et al., describes a method for measuring local residual stress of an outer surface portion of a TBC. While these approaches map stress near the TBC surface or at the TGO interface, they are not able to detect the presence of cracking throughout the thickness of a TBC nor the roughness of the TBC substrate interfacial region.

A holistic approach to TBC health inspection would require simultaneous assessment of cracking and degree of stress. A. B. Vakhtin, et al., paper presented at the ASME Turbo Expo 2007: Power for Land, Sea and Air (GT2007), Montreal, Canada, 2007, combined OCT imaging of TBCs with measurements of stress within the TBC using PLPS. PLPS, however, represents a laboratory-based method and is not ideally suited to ready inspection of in-service parts. An all-optical imaging method for health inspection is essential.

BRIEF SUMMARY OF THE INVENTION

The present invention is of a method (and concomitant apparatus and computer software embodied on a non-transitory computer readable medium) for evaluating the condition of a ceramic coating deposited on a substrate, comprising: illuminating the ceramic coating with light; measuring the intensity of light returned from the ceramic coating as function of depth in the coating and transverse position on the coating; and analyzing the measured light intensities to obtain one or more of intensity of the light returned from the exposed coating surface relative to the intensity of light returned from the coating/substrate interface, intensity of the light returned from the coating/substrate interface relative to the intensity of light returned from the bulk of the ceramic coating, determination of roughness at the exposed surface of the ceramic coating, and determination of roughness of the interface between the ceramic coating and underlying bond coat or substrate. In the preferred embodiment, measuring utilizes low coherence interferometry, more preferably optical coherence tomography, and most preferably Fourier domain optical coherence tomography. Alternatively, the invention can employ a spectral domain optical coherence tomography instrument and a broadband light source, a balanced photodetector and a swept source laser, or a time domain optical coherence tomography system with a scanning optical delay line. Preferably, analyzing utilizes depth profiles with spatial resolution of about 25 μm or less and determines degree of microcracking of the coating. Illuminating preferably utilizes a broadband superluminescent diode, and measuring a fiber optic interferometer and an InGaAs linescan camera. The wavelength of the illuminating light is preferably within the range of 1.5 μm to 2.2 μm. Determination of roughness is preferably according to ISO 4287-1997 Softgauge standard for arithmetic mean deviation (Ra), root mean square deviation (Rq), or tortuosity. An index-matching fluid of index of refraction greater than or equal to 1.6 and less than or equal to 2.0 is preferably provided to an outer surface of the ceramic coating.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
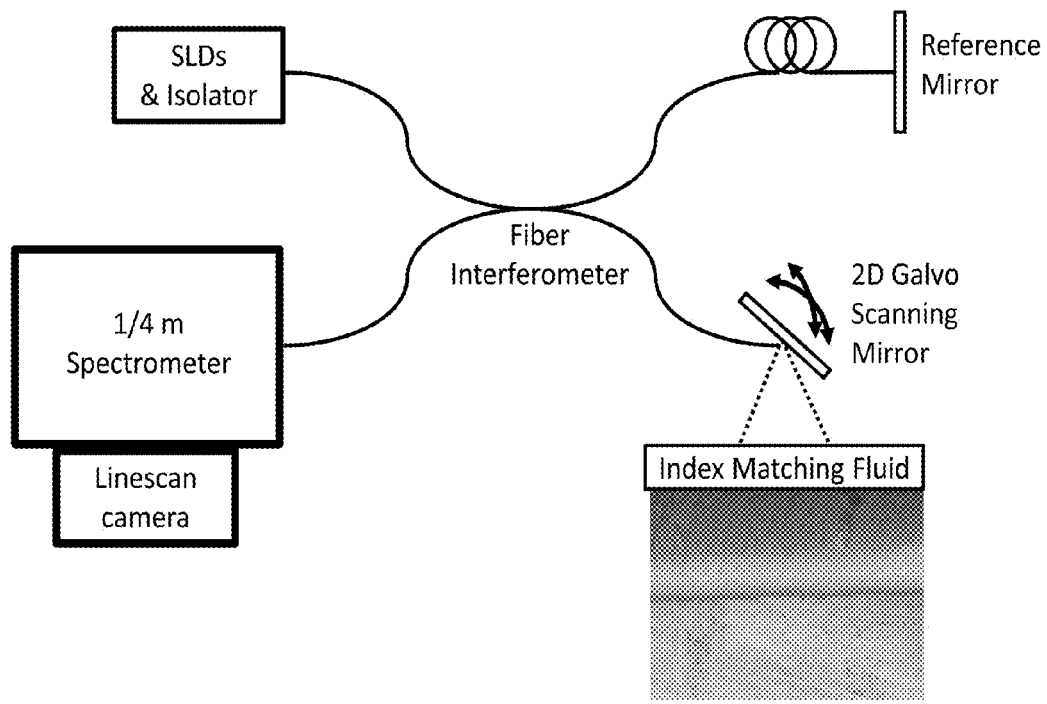
FIG. 1 is a conceptual diagram of an exemplary system for measuring backscattered light from a thermal barrier coating sample.

The present invention provides a method of photometric data collection and interpretation to determine the condition and remaining life of ceramic coatings, and in particular thermal barrier coatings. The method utilizes measurements of back-scattered light throughout the entire thickness of a thermal barrier coating to evaluate key metrics correlated with stress at the coating—substrate interface and with thermal aging of the coating. The invention allows for one to non-destructively inspect and evaluate the condition of a ceramic coating. The method comprises obtaining high resolution, depth-resolved optical images of a coating and obtaining quantitative metrics from such images that are correlated with the condition of the coating. A purpose of the invention is to use these metrics to indicate the remaining time of use (remaining service life) or the health of a coating. In particular, the method is useful for non-destructive evaluation of ceramic thermal barrier coatings.

A primary advantage of the invention is that the full thickness of the coating is inspected and evaluated without cutting or otherwise damaging the object under inspection. Another important advantage of the invention is that quantitative metrics are derived from optical images of the coating rather than relying on visual interpretation of images of the coating. A further advantage of the invention is that the above mentioned metrics have been shown to be indicative of coating condition without need to combine the method with other means of inspection. A yet further advantage of the method is that optical imaging allows implementation via a fiber optic probe providing the opportunity to inspect coatings in situ such as inspecting coatings on turbine parts without disassembly or with a reduced degree of disassembly of the turbine.

To practice the invention, an apparatus is preferred that can measure the intensity of light returned from a coating where the returned light intensity is obtained as a function of depth in the coating and transverse position on the coating. Such measurements may then be used to construct two-dimensional cross-sectional images or three dimensional images of the coating or of regions within the coating. Individual one-dimensional depth profiles of the light intensity returned from the sample may also be analyzed. It is highly desirable that light returned from a multiplicity of depths through the full thickness of the coating is collected, especially light scattered or reflected from the coating—substrate interface. It is also highly desirable that the spatial resolution of the obtained depth profiles and images is of the order of 25 micrometers or less.

A preferred manner in which to make such measurements is to use a technique and associated apparatus known as optical coherence tomography (OCT). OCT is a low coherence interferometric imaging method which is in use in biological and medical imaging applications. Existing commercial applications of OCT include two and three-dimensional imaging of the eye and of coronary arteries. OCT can be applied to imaging of other types of material including ceramics, with varying success depending on the optical properties of the material. There are different hardware approaches to implementing OCT, with differing advantages or disadvantages. The present invention may be practiced using any one of a variety of OCT techniques and apparatuses. An advantage to using OCT over other means of optical imaging is its inherent ability to obtain depth resolved images non-destructively over depths of one millimeter or more.

The present method for inspection and evaluation of ceramic coatings can be achieved using a plurality of OCT approaches, such as using a spectral domain OCT instrument with broadband light source, spectrometer and camera; a swept source laser with a balanced photodetector; or a time domain OCT system with scanning optical delay line. Other instruments for measuring depth resolved light scattered or reflected from within the coating may also be used.

Practice of the method is not dependent on choice of illumination wavelength. However, best results are achieved in regions of the electromagnetic spectrum where coating components absorb light less strongly. Preferably, near infrared with optical wavelengths between 1500-2200 nm are used.

Light penetration and image quality is also improved by the use of an index matching fluid in contact with the sample surface to reduce bright reflection of light from the surface of the coating. TBCs have an index of refraction of about 2.0, thus an index matching fluid with refractive index greater than 1.6 but less than 2.0 is preferred.

Once depth resolved optical images of the coating are obtained, several key metrics that we have shown to be correlated with coating thermal aging are mathematically derived from the images. The metrics include image contrast, penetration ratio, and roughness of TBC interfaces such as air/top coat, topcoat/bond coat, or bond coat/substrate. These metrics were shown to correlate with changes in the coating resulting from thermal aging as measured by photoluminescent piezo spectroscopy (PLPS) and by destructive optical and x-ray microscopy. Tortuosity, defined as the ratio of the actual interfacial path length from the start to end of a sampling length to the shortest linear distance between the same two points, and degree of microcracking are other parameters found to be useful in evaluating coating health or remaining service life. Degree of microcracking may be determined by the presence of crack-like features in the image or by an increase in light scattered from the bulk of the ceramic coating. Although any one of these metrics may be used individually to evaluate a ceramic coating, using two or more of these metrics in combination is preferable.

Note that the following terms are defined as follows for the specification and claims: Image contrast means the intensity of light collected from the coating—substrate interface relative to the intensity of light collected from the bulk of the ceramic coating. Penetration ratio means the intensity of light collected from the coating/air surface relative to the intensity of light collected from the coating/substrate interface. Coating/substrate interface may mean the interface between a ceramic coating ("top coat") and a bond coat or may mean the interface between a bond coat and the substrate upon which the coating is deposited. Roughness is a measurement of the deviation at a discrete point from the average value of the surface or interface position over a sampling length. Tortuosity reflects a ratio of the actual interfacial path length from the start to end of a sampling length to the shortest linear distance between the same two points.

Photometric data are preferably collected by a means that provides imaging throughout the entire thickness of the coating. To demonstrate this method of non-destructive inspection and evaluation of ceramic coatings, OCT was chosen as the imaging means. A variant of OCT known as Fourier domain optical coherence tomography (FD-OCT, also known as spectral domain OCT and optical frequency domain interferometry) was used. FIG. 1 shows a conceptual representation of the FD-OCT instrument used to demonstrate the method. A broadband superluminescent diode (SLD) light source was coupled to a fiber optic interferometer, with detection achieved by a combination of spectrometer and camera. For high speed image acquisition, a linescan camera is preferred. The material under study is illuminated by a beam of light exiting the sample arm of the interferometer. Interfaces and defects such as microcracks in the object under inspection scatter the light.

Some of the back-scattered light from the object travels back into the interferometer and interferes with light returning from the reference arm of the interferometer. Light exiting the detection arm of the interferometer is spectrally dispersed and detected by the camera. The optical interference produces a fringe pattern (oscillating intensity pattern) on the spectrally dispersed detected light. This detected spectrum is called a spectral interferogram and the frequencies of the fringes or oscillations encode information regarding the depth in the object from which the light was scattered.

Applying a Fourier transform to the spectral interferogram produces a one-dimensional depth profile that locates interfaces, defects, and other structural features in the sample. Differential methods are used to improve the image quality by removing the light source spectrum and background and autocorrelation features from the spectral interferogram. Two and three dimensional intensity images are obtained by moving the sample under the light beam, or by moving the light beam across the sample.

The FD-OCT instrument is very simple. Other than a means to scan the beam across the sample, it has no moving parts and all the information on the depth profile is collected simultaneously in an inherently parallel way. FD-OCT is easily implemented with a fiber-optic coupled interferometer and fiber-optic probe, making it easy to use for commercial applications.

Practice of the method is not dependent on choice of illumination wavelength. However, best results are achieved by using light in regions of the electromagnetic spectrum where coating components absorb light less strongly (generally, in the near infrared). For highly scattering materials, it is well-known that using longer wavelengths of light may provide deeper penetration of light into the material. For these reasons, the demonstration apparatus used SLD light sources centered at 1550 nm or at 1960 nm wavelengths. Light in the region of 1550 nm can be detected using a standard InGaAs linescan camera. To detect light near 1960 nm, an extended wavelength InGaAs linescan camera was used. The extended wavelength camera has lower sensitivity and a higher noise floor. Furthermore, the spatial resolution of OCT depends on the light source wavelength, with longer wavelengths providing worse resolution. Therefore, although 1960 nm light exhibited increased penetration into TBCs, the sharpness of the images obtained with 1550 nm light was better. According to the above considerations, illumination light of wavelength between 1500 and 2200 nm is preferred.

Figure 2:
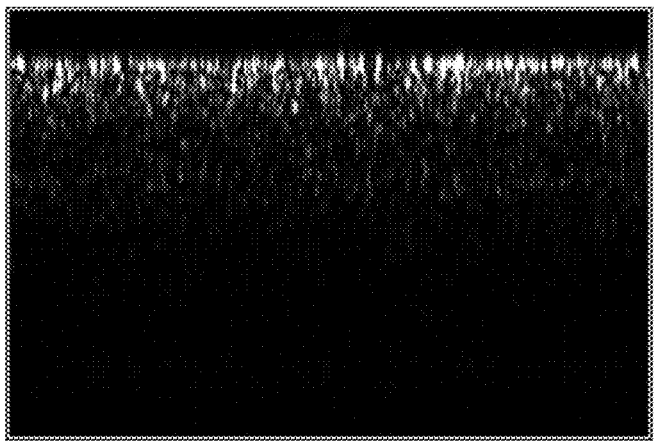
FIG. 2 provides typical images of thermal barrier coatings imaged by OCT illustrating enhanced light penetration through the use of an appropriate index matching fluid.
Figure 2:
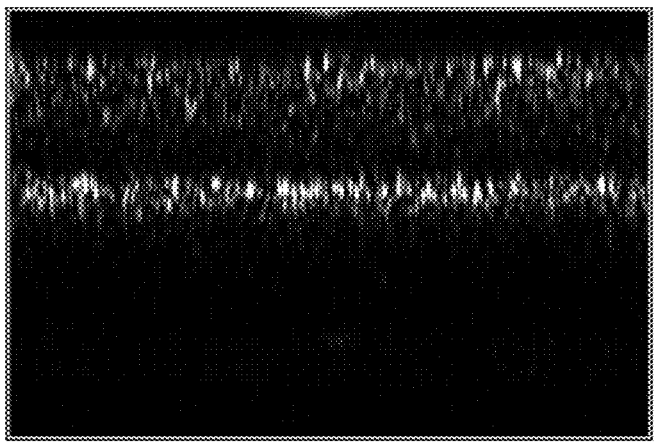

Using an index matching fluid minimizes the light reflection from the coating's surface and reduces scattering within the bulk of the coating. The index of refraction of an yttrium stabilized zirconium (YSZ) TBC (a type commonly used in aircraft and power turbines) is approximately 2.0. The ideal matching liquid would have an index near to this value but must not match it exactly or all back reflection would be suppressed and voids and cracks will become invisible to OCT. In choosing the best liquid it is necessary that, in addition to reducing reflection and providing transparency, it infiltrates the structure well, can be removed from the surface by heating or reduced pressure, and does not present a health hazard to operators. After considering several candidates, we found that the Cargille Refractive Index Liquid $n_D=1.6$, which is a proprietary mixture of 1-bromonaphthalene and hydrogenated terphenyl, performed the best across all criteria and reduced surface scattering considerably during imaging. Fluids of lower refractive index did not perform as well. FIG. 2 compares two OCT images of a TBC, one obtained with the index matching fluid and one obtained without the index matching fluid. Use of the index matching fluid results in greater penetration of light to the coating/substrate interface and correspondingly better imaging of the interfacial region.

A longitudinal study of TBC response to thermal cycling was performed. One inch diameter test coupons with YSZ TBC deposited on the surface were used. The TBC was deposited using electron beam plasma vapor deposition (EB-PVD) and the physical thickness of the coating was 170-180 micrometers. Thermal cycling tests were performed on the test coupons for a total of 200 hours until TBC failure was reached. Hour-long thermal cycles comprised a 10 minute ramp up to the maximum temperature of 1150 C, holding for 40 minutes at the maximum temperature, followed by a 10 minute air quenched cool down to ambient temperature. These cycles were repeated continuously over four discrete 50-cycle stages. FD-OCT measurements (1550 nm and 1960 nm) were conducted for uncycled samples and both FD-OCT and PLPS measurements were taken after 50, 100, 150 and 200 cycles. PLPS measurement indicated that these intervals corresponded to 25, 50, 75, and 100% total life of the TBCs. Earlier work showed that PLPS measurements (which measures stress within the coating) strongly correlate to percent to failure or percent remaining life of the coating.

A total of five 5.8 mm long transverse scans were taken for each test coupon at each thermal cycling interval by translating the illumination beam across the test coupon. FIG. 3 summarizes FD-OCT imaging throughout the longitudinal study. The depth scale of the images represents a physical thickness, corresponding to the quotient of the measured optical thickness and an assumed index of refraction of 2.0 for the EB-PVD TBC. The bond coat interface of uncycled EB-PVD samples can be seen readily. As the thermal cycling progresses, more scattering is apparent throughout the thickness of the TBC.

Collected images were analyzed for the following four parameters: image contrast, penetration depth, roughness, and tortuosity.

Figure 4:
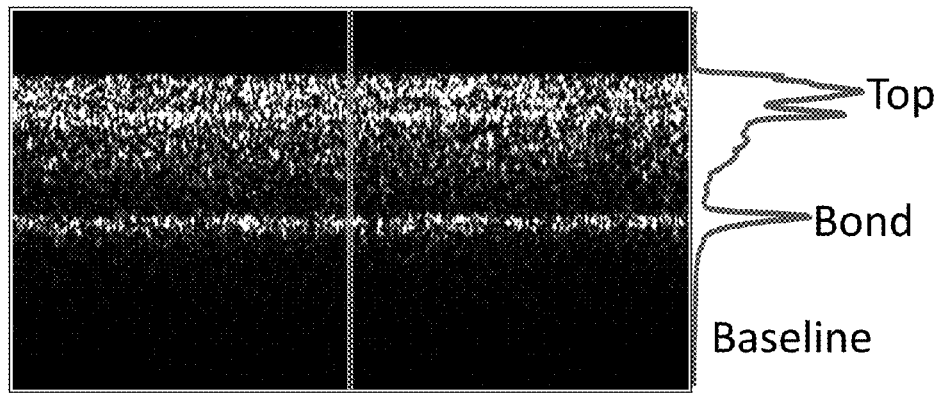
FIG. 4 is a schematic diagram showing metrics of merit for evaluating thermal barrier coating condition.
Figure 4:
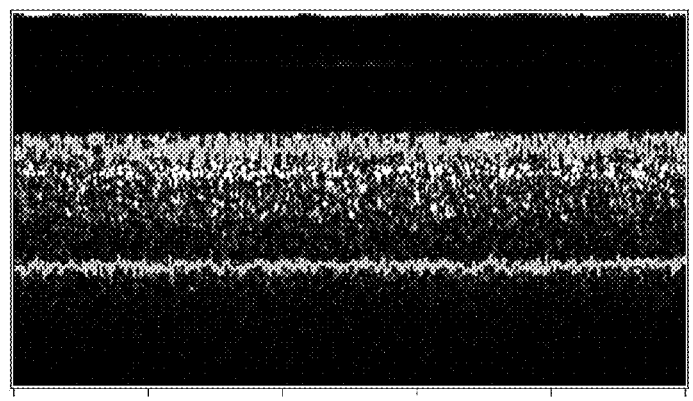
Figure 4:
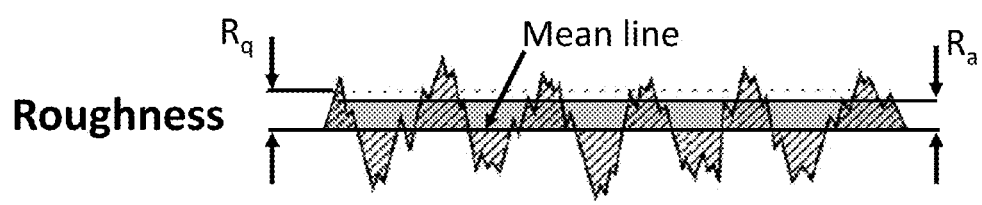

These parameters are illustrated with respect to an FD-OCT transverse scan of an EB-PVD sample in FIG. 4. A post-processing routine was created to measure each of these parameters for all collected images. For each depth scan in a transverse scan, a simplex algorithm finds local minima in the vicinity of expected interface boundaries. A Gaussian function is then fit to the depth scan using these minima as bounds, and this fitting procedure allows the peak in the depth scan associated with a boundary to be defined at greater than axial resolution. The magnitudes of the peaks are used to evaluate the contrast and penetration ratio. Peak locations for each depth scan delineate en face boundary profiles, illustrated by gray traces in FIG. 4. Surface or interfacial roughness of these profiles is analyzed based on the ISO 4287-1997 Softgauge standard for arithmetic mean deviation (Ra), root mean square deviation (Rq), and tortuosity, per I. O. f. S. (ISO), Geometrical Product Specifications (GPS)—Surface texture: Profile method—Terms, definitions and surface texture parameters (1997).

Figure 3A:
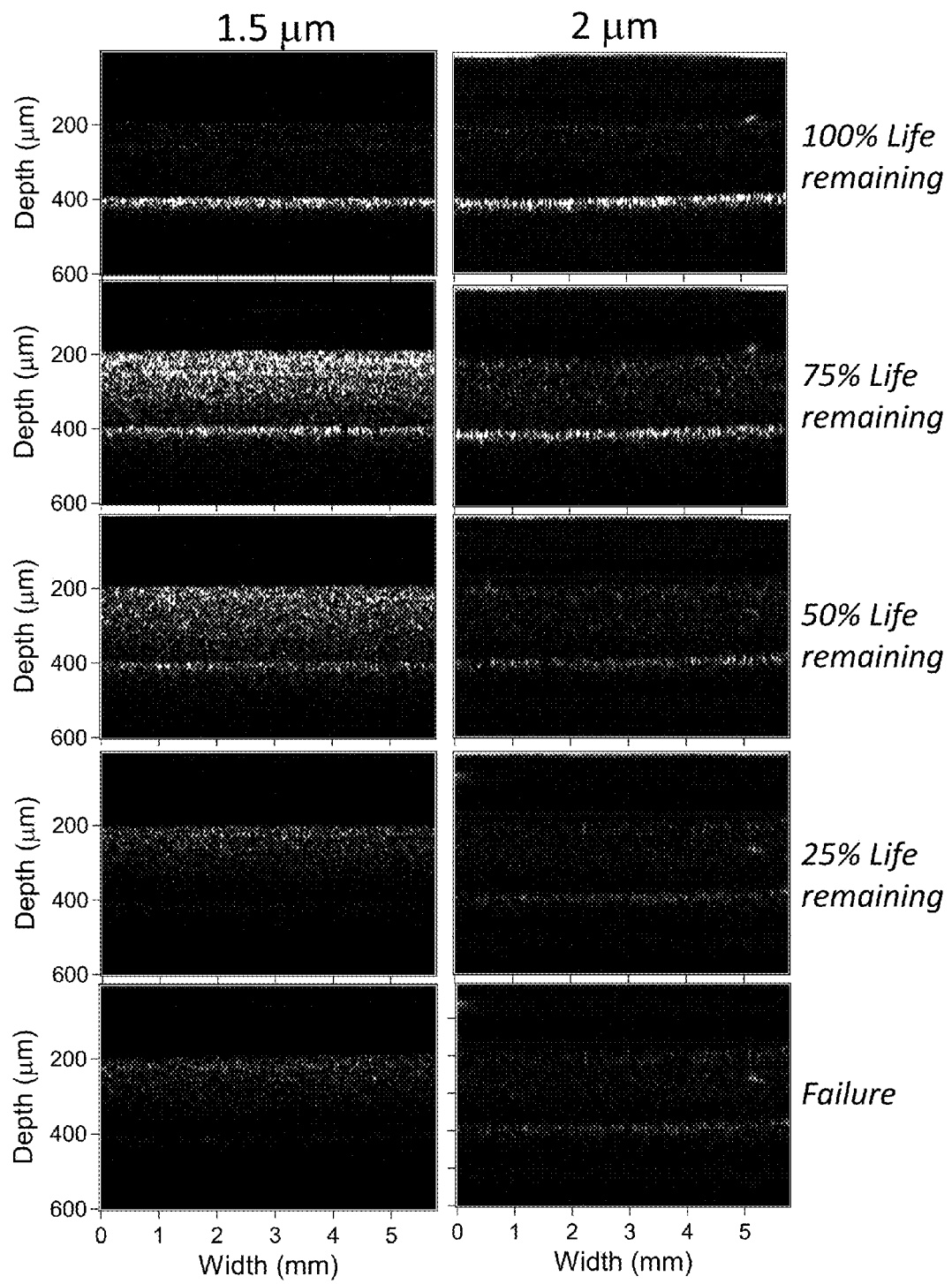
FIG. 3 provides FD-OCT imaging of ?EB-PVD TBC samples through the longitudinal study: A) All images scaled to uncycled sample; B) Images scaled to the maximum within each image.
Figure 3B:
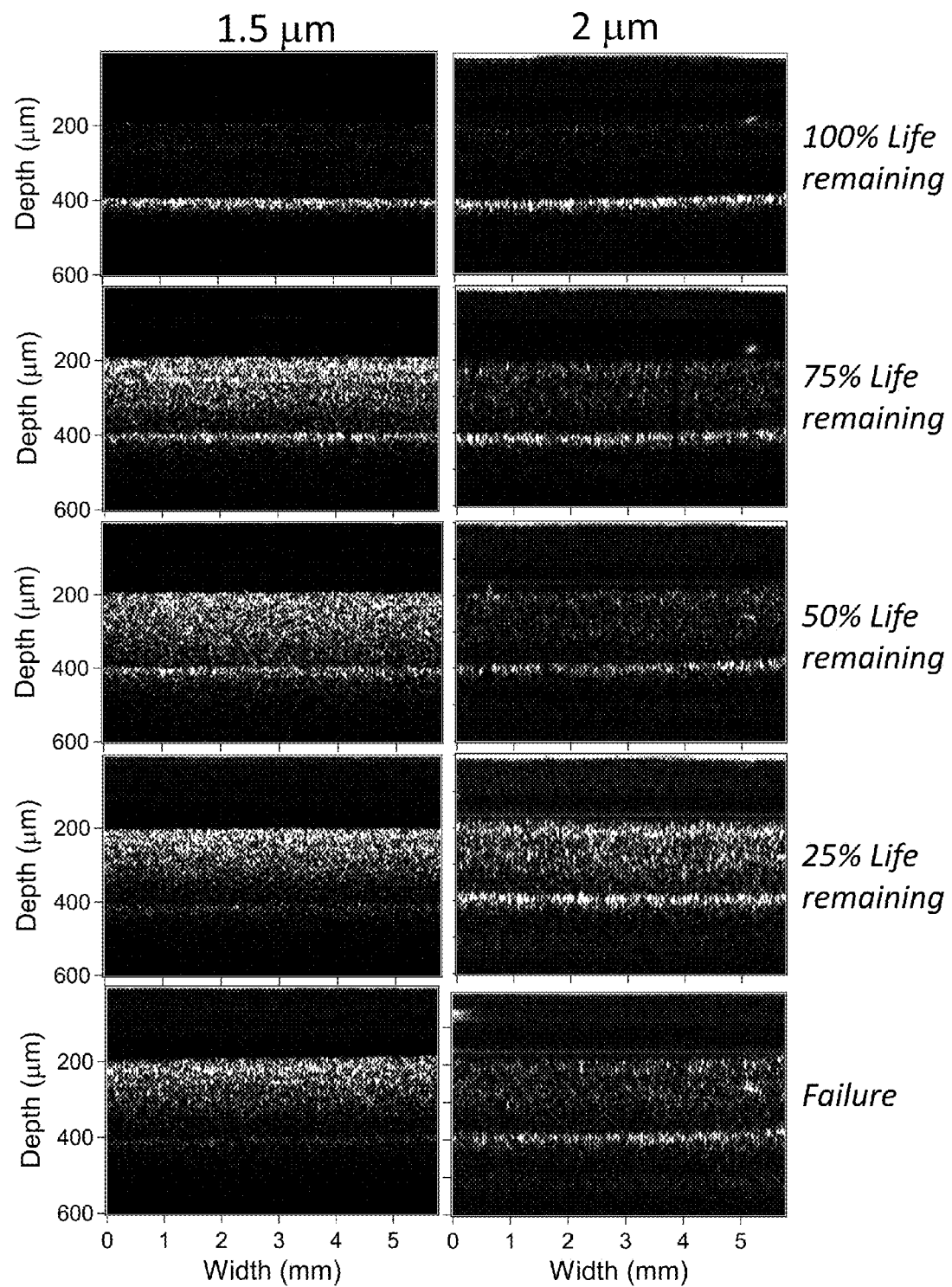

FIG. 3A illustrates the reduction in contrast and penetration ratio with thermal cycling. All images are scaled to the intensity of the uncycled images, showing how much dimmer and less intense the FD-OCT signal becomes with thermal cycling. This is almost surely due to the progressive microcracking damage occurring in the bulk of the TBC. The images shown in FIG. 3B are the same as those in FIG. 3A, but with the intensity of each image scaled to maxima within the image rather than to the un-cycled maximum. Here, it is clear that even as the contrast and penetration ratio decrease, the bond interface is still apparent in the FD-OCT images.

Figure 5:
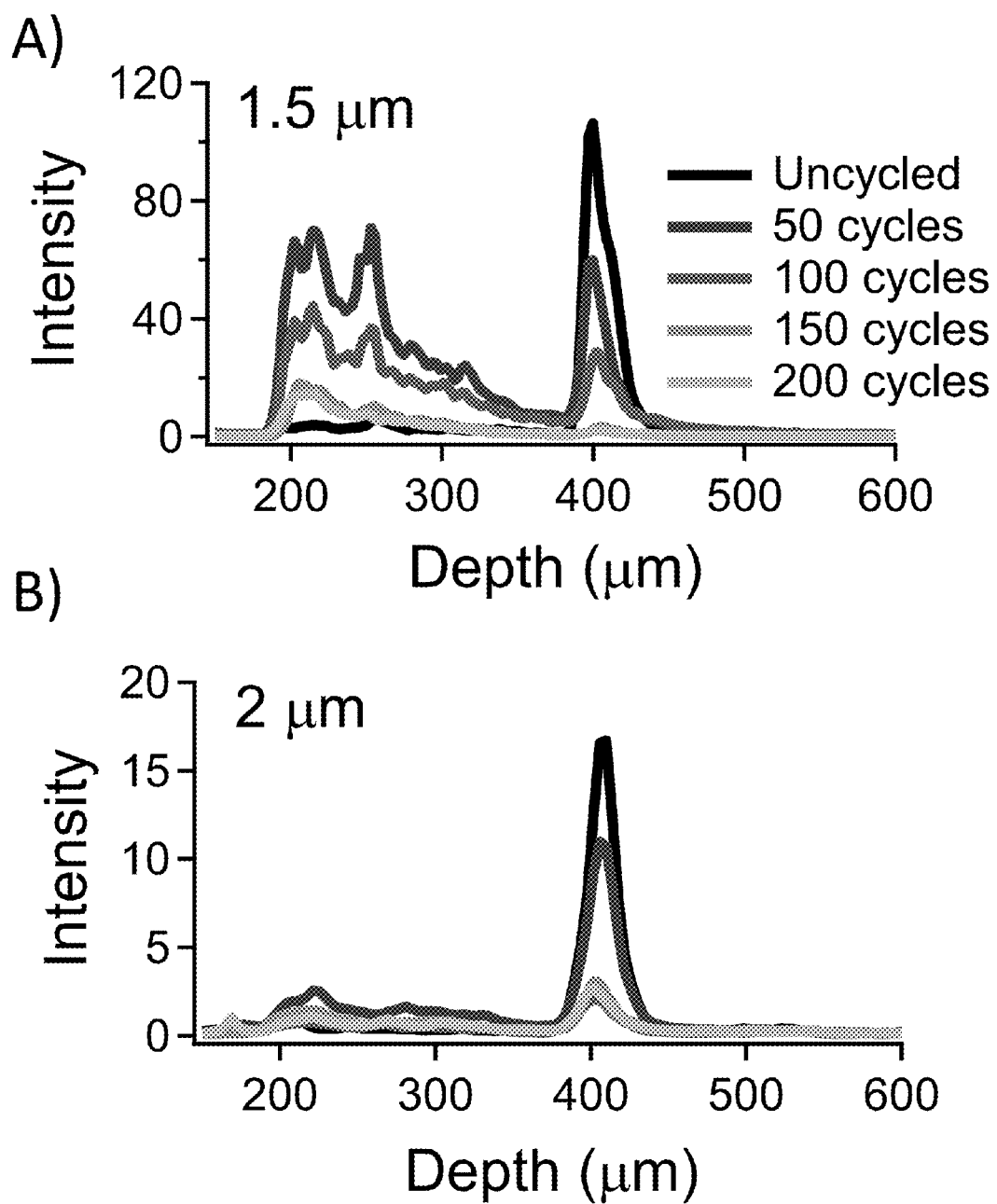
FIG. 5 provides average profiles of EB-PVD TBC samples at each interval of the longitudinal study as measured by A) 1550 nm FD-OCT, and B) 2000 nm FD-OCT.

Averaging all depth scans across a transverse scan yields an average depth profile through the TBC sample. Average profiles for the longitudinal study are shown in FIG. 5. The profiles show that TBC thickness can be readily measured if the sample index of refraction is properly calibrated, and also demonstrate the increased penetration ratio achieved by the 1960 nm FD-OCT system. Intensity differences apparent between the two FD-OCT systems are attributable to reflective losses of the objective lens at 1960 nm. The intensity of light reflected back from the bond interface was sufficient throughout thermal cycling to define the interface at both illumination wavelengths using the simplex algorithm.

Figure 6:
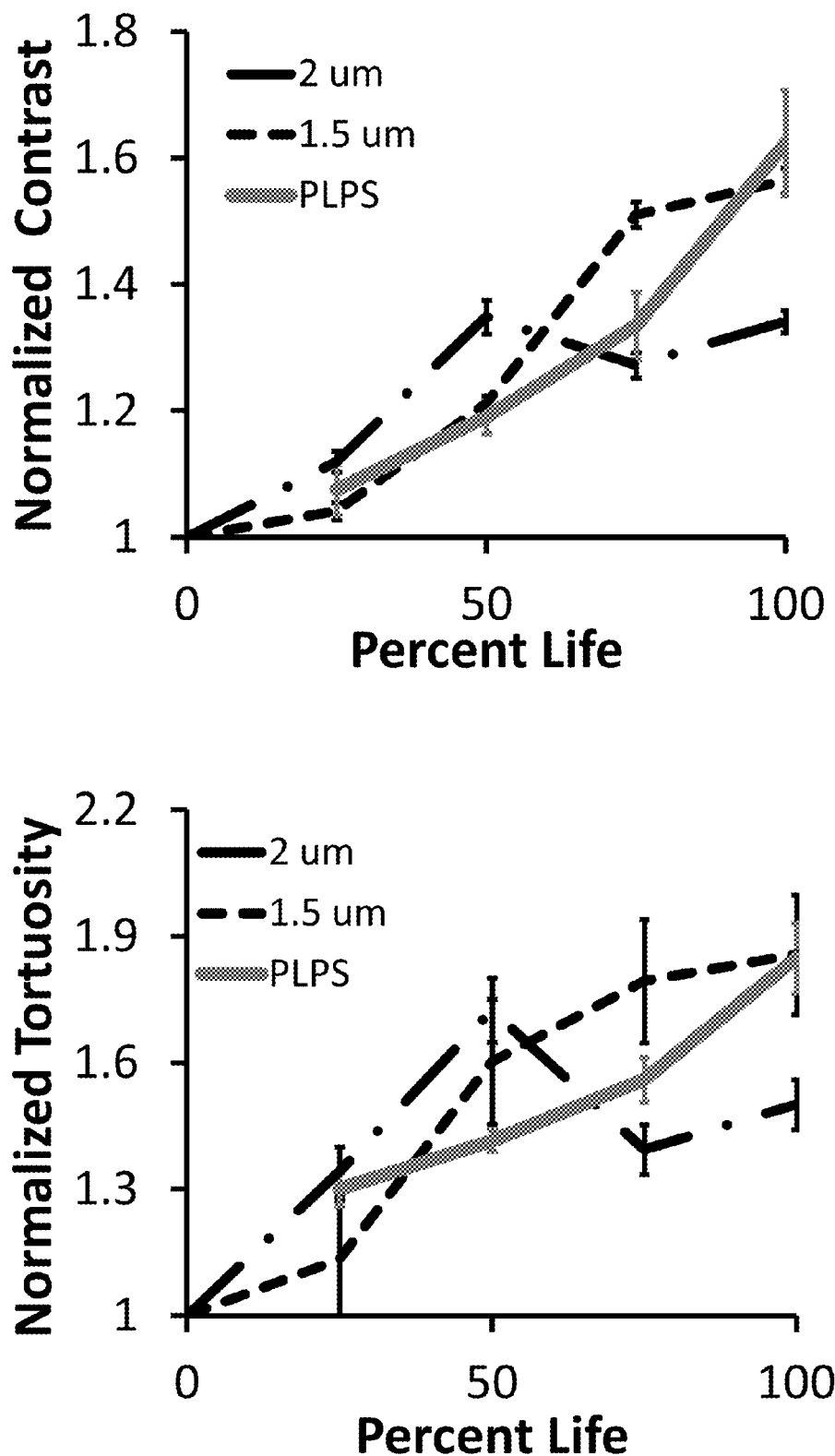
FIG. 6 is an example comparison between trends in optically derived condition measurements and PLPS stress measurements.

To compare FD-OCT and PLPS results, changes in key parameters were normalized to their initial values. Since PLPS measurements require the presence of a thermally grown oxide which results from thermal cycling, the results were normalized to the average value after 50 cycles and an offset was applied to the normalized PLPS trend to investigate relationships between PLPS results and the metrics obtained from FD-OCT imaging. As shown in FIG. 6, normalized change in PLPS measurements (gray trace) is in very good agreement with the normalized change of FD-OCT measurements for contrast of the bond interface and the tortuosity of the bond interface. The low variability of these FD-OCT metrics and their strong agreement to the PLPS results, which have been demonstrated to be related bond coat stress and remaining service life indicate good reliability in using this method as a nondestructive evaluation tool for evaluating the remaining life of a TBC.

The described method provides considerable advantages for nondestructive evaluation of TBCs and other ceramic coatings. The high repeatability and low variability of metrics derived from FD-OCT images indicate good reliability for use as a nondestructive TBC evaluation tool. The method is particularly well suited to inspecting and evaluating TBCs created by electron beam physical vapor deposition (EB-PVD) and is anticipated to also be of use for metrology of other types of TBC coatings such as those deposited by air plasma spray (APS). This method may also be applied to other types of ceramic coatings in general.

In the preferred embodiment, and as readily understood by one of ordinary skill in the art, an apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for evaluating the condition of a ceramic coating deposited on a substrate, the method comprising the steps of:
    illuminating the ceramic coating with light;
    measuring the intensity of light returned from the ceramic coating as function of depth in the coating and transverse position on the coating by utilizing low coherence interferometry; and
    analyzing the measured light intensities to obtain one or more of the group consisting of:
        intensity of the light returned from the exposed coating surface relative to the intensity of light returned from the coating/substrate interface;
        intensity of the light returned from the coating/substrate interface relative to the intensity of light returned from the bulk of the ceramic coating;
        determination of roughness at the exposed surface of the ceramic coating; and
        determination of roughness of the interface between the ceramic coating and underlying bond coat or substrate.

2. The method of claim 1 wherein the measuring step utilizes optical coherence tomography.

3. The method of claim 2 wherein the measuring step utilizes Fourier domain optical coherence tomography.

4. The method of claim 2 wherein the measuring step utilizes a spectral domain optical coherence tomography instrument and the illuminating step utilizes a broadband light source.

5. The method of claim 2 wherein the measuring step utilizes a balanced photodetector and the illuminating step utilizes a swept source laser.

6. The method of claim 2 wherein the measuring step utilizes a time domain optical coherence tomography system with a scanning optical delay line.

7. The method of claim 1 wherein the analyzing step utilizes depth profiles with spatial resolution of about 25 µm or less.

8. The method of claim 1 wherein the analyzing step determines degree of microcracking of the coating.

9. The method of claim 1 wherein the illuminating step utilizes a broadband superluminescent diode.

10. The method of claim 1 wherein the measuring step utilizes a fiber optic interferometer.

11. The method of claim 1 wherein the measuring step utilizes an InGaAs linescan camera.

12. The method of claim 1 wherein the wavelength of the illuminating light is within the range of 1.5 µm to 2.2 µm.

13. The method of claim 1 wherein determination of roughness is according to ISO 4287-1997 Softgauge standard for arithmetic mean deviation (Ra), root mean square deviation (Rq), or tortuosity.

14. The method of claim 1 additionally comprising the step of providing an index-matching fluid of index of refraction greater than or equal to 1.6 and less than or equal to 2.0 to an outer surface of the ceramic coating.

* * * * *

UNITED STATES PATENT AND TRADEMARK OFFICE
CERTIFICATE OF CORRECTION

PATENT NO. : 9,488,470 B1  
APPLICATION NO. : 14/180914  
DATED : November 8, 2016  
INVENTOR(S) : Kristen A. Petersen et al.

Page 1 of 1

It is certified that error appears in the above-identified patent and that said Letters Patent is hereby corrected as shown below:

On the Title Page

Item (73) Assignees, currently reads:  
University of Conneticut, Farmington, CT (US); Southwest Sciences Incorporated, Sante Fe, NM (US)

Should read:  
--University of Connecticut, Farmington, CT (US); Southwest Sciences Incorporated, Santa Fe, NM (US)--

Signed and Sealed this  
Fourteenth Day of February, 2017

Michelle K. Lee  
*Director of the United States Patent and Trademark Office*